(12) United States Patent
Krogh et al.

(10) Patent No.: US 11,873,794 B2
(45) Date of Patent: Jan. 16, 2024

(54) GENERATOR-GEARBOX ASSEMBLY FOR A WIND TURBINE

(71) Applicant: Vestas Wind Systems A/S, Aarhus N. (DK)

(72) Inventors: Lars Langvardt Krogh, Egå (DK); Henrik Zaar Mannik, Hammel (DK)

(73) Assignee: Vestas Wind Systems A/S, Aarhus N (DK)

( * ) Notice: Subject to any disclaimer, the term of this patent is extended or adjusted under 35 U.S.C. 154(b) by 304 days.

(21) Appl. No.: 17/312,713

(22) PCT Filed: Dec. 3, 2019

(86) PCT No.: PCT/DK2019/050376
§ 371 (c)(1),
(2) Date: Jun. 10, 2021

(87) PCT Pub. No.: WO2020/125884
PCT Pub. Date: Jun. 25, 2020

(65) Prior Publication Data
US 2022/0018335 A1 Jan. 20, 2022

(30) Foreign Application Priority Data
Dec. 20, 2018 (DK) .......................... PA 2018 70841

(51) Int. Cl.
*F03D 15/00* (2016.01)
*F03D 9/25* (2016.01)
*F16D 1/06* (2006.01)

(52) U.S. Cl.
CPC .............. *F03D 15/00* (2016.05); *F03D 9/25* (2016.05); *F16D 1/06* (2013.01);
(Continued)

(58) Field of Classification Search
CPC ... F03D 9/25; F03D 15/00; F16D 1/06; F16D 2001/062; F05B 2220/706; F05B 2230/604; F05B 2260/4031; F05D 2240/60
See application file for complete search history.

(56) References Cited

U.S. PATENT DOCUMENTS

2010/0171317 A1\* 7/2010 Trede ...................... F03D 13/20
290/55
2010/0329867 A1 12/2010 Patel et al.
(Continued)

FOREIGN PATENT DOCUMENTS

CN 101936265 A 1/2011
CN 102207119 A 10/2011
(Continued)

OTHER PUBLICATIONS

Danish Patent and Trademark Office, Search and Examination Report in PA 2018 70841, dated May 21, 2019.
(Continued)

*Primary Examiner* — Audrey B. Walter
(74) *Attorney, Agent, or Firm* — Wood Herron & Evans LLP (57) ABSTRACT

A generator-gearbox assembly for a wind turbine includes a generator having a generator rotor, a gearbox including an output shaft, and a connection assembly. The connection assembly a hub abutment surface and a plurality of shaft bolt holes, a hub associated with the generator rotor with a first connecting portion (340) having a shaft abutment surface and at least one elongated slot extending through the first connecting portion. The number of elongated slots is less than or equal to the number of shaft bolt holes. A plurality of fasteners fixedly connect the hub to the hub abutment
(Continued)

surface, each fastener extending through a respective elongated slot and a shaft bolt hole.

21 Claims, 6 Drawing Sheets

(52) U.S. Cl.
CPC ... *F05B 2220/706* (2013.01); *F05B 2230/604* (2013.01); *F05B 2260/4031* (2013.01); *F05D 2240/60* (2013.01); *F16D 2001/062* (2013.01)

(56) References Cited

U.S. PATENT DOCUMENTS

| | | |
|---|---|---|
| 2011/0260461 A1 | 10/2011 | Egoshi et al. |
| 2012/0201679 A1 | 8/2012 | Heidenreich et al. |

FOREIGN PATENT DOCUMENTS

| | | | |
|---|---|---|---|
| CN | 103075308 A | 5/2013 | |
| CN | 103375498 A | 10/2013 | |
| EP | 2397309 A1 | 12/2011 | |
| EP | 2532886 A1 | 12/2012 | |
| WO | WO-2010069325 A1 * | 6/2010 | ............ F03D 15/00 |
| WO | 2015048372 A1 | 4/2015 | |

OTHER PUBLICATIONS

European Patent Office, International Search Report and Written Opinion in PCT Application No. PCT/DK2019/050376, dated Mar. 20, 2020.
China National Intellectual Property Administration, office action issued in corrsponding Chinese patent application No. 201980084513. 6, dated Apr. 29, 2023, with English translation.

* cited by examiner

GENERATOR-GEARBOX ASSEMBLY FOR A WIND TURBINE

FIELD OF THE INVENTION

This invention relates to a connection assembly for fixedly connecting an output shaft of a gearbox of a wind turbine to a generator of the wind turbine, and a method of connecting an output shaft of a gearbox of a wind turbine to a generator of the wind turbine. The invention further relates to a generator-gearbox assembly and a wind turbine.

BACKGROUND ART

One very challenging aspect of assembling a wind turbine lies in connecting the gearbox output to the generator input of the wind turbine.

Conventionally, the generator rotor and the gearbox are connected at the output shaft of the gearbox by means of bolts. At the outer end of the output shaft, a plurality of bolt holes are usually provided in some arrangement. In such a configuration, a connection element of the rotor of the generator has a corresponding number and arrangement of bolt holes. So as to connect the generator and the output shaft of the gearbox, the output shaft is arranged to abut the connection element of the generator. The output shaft and/or the generator rotor then needs to be moved and/or rotated such that the bolt holes of the output shaft and the bolt holes of the generator rotor are perfectly aligned. Only then can bolts be fed through the bolt holes of the output shaft and the generator and securely fixed. To ensure fixed connection, a bolt must be passed through each bolt hole of the output shaft and each bolt hole of the generator.

During assembly of the wind turbine power train, the rotor of the generator and the gearbox output shaft are often locked into a random position and can only be moved or rotated to a limited degree. The weight of the parts and the tight spaces they are installed into make it even more difficult to manoeuvre accurately. Often, only the output shaft can be rotated over a maximum of 4 degrees either way, and special tools are needed for making this possible. As a result, it is very difficult to arrange the output shaft in the correct position with respect to the bolt holes of the generator for attachment. It is against this background that the invention has been devised.

SUMMARY OF THE INVENTION

According to an aspect of the invention, there is provided a generator-gearbox assembly for a wind turbine comprising a generator having a rotational element in the form of a generator rotor; a gearbox comprising an output shaft; and a connection assembly. The connection assembly comprises a hub abutment surface, provided at an end of the output shaft and a plurality of shaft bolt holes; a hub associated with the generator rotor and comprising a body and a first connecting portion having a shaft abutment surface facing towards the hub abutment surface and at least one elongated slot extending through the first connecting portion. The number of elongated slots is less than or equal to the number of shaft bolt holes. A plurality of fasteners fixedly connect the hub to the hub abutment surface, each fastener extending through a respective elongated slot and a shaft bolt hole.

Note that in this discussion, the connecting portions may be circular flanges.

The hub being arranged for fixed attachment to the rotational element and having a first flange with elongated slots reduces the likelihood of having to manoeuvre a cumbersome drive shaft into an exact position for attachment to a rotational element. Since the slots are elongated, when the drive shaft is arranged to abut the first flange during assembly it is more likely that the shaft bolt holes of the hub abutment surface align with the elongated slots of the first flange, and so it is more likely that a connection can be made between the drive shaft and the rotational element. If the number of elongated slots is less than the number of shaft bolt holes, the slots can be made larger and it is even more likely that the shaft bolt holes of the hub abutment surface align with the elongated slots of the first flange, and hence that a secure connection can be made.

Between every two adjacent slots, there is a bridge portion that depending on its width and rotational position with respect to the hub abutment surface may cover one or more shaft bolt holes. Where there are multiple slots, the number of bridge portions will be equal to the number of slots. When the width of the bridge portions is such that they can never cover more than one shaft bolt hole and the number of shaft bolt holes is a multiple of the number of slots, only two rotational configurations are possible. One configuration in which the bridge portions end up exactly in between two shaft bolt holes and all shaft bolt holes can receive a fastener. And one configuration in which each bridge portion, partly or fully, blocks one shaft bolt hole. In the latter configuration, the number of shaft bolt holes that can receive a fastener equals the number of shaft bolt hole minus the number of slots. If the number of slots is not a multiple of the number of slots, the number of blocked shaft bolt holes will be in between zero and the total number of slots.

Preferably, the connection assembly further comprises a washer and the washer comprises a plurality of washer bolt holes. The fasteners may successively extend through the washer bolt holes, the elongated slots and the shaft bolt holes. In contrast with the elongated shape of the slots, the washer bolt holes can be shaped to match the shape and dimension of the bolts, thereby allowing a bolt head to contact the washer around the whole circumference of the washer bolt hole. Such a washer can provide a more secure connection than when the bolt is directly inserted into the elongated slot.

For the purposes of this discussion, the term 'washer' should be interpreted as a shim-like element which functions as an intermediate element between two components to even out the compressive stress between those two components. As such, a washer may be a small ring of material that may be received over a single bolt. Alternatively, a washer may be a larger ring, or a ring section, that is penetrated by several apertures each of which apertures is suitable for receiving a bolt therethrough.

The number of washer bolt holes may be equal to the number of shaft bolt holes. With such a washer, and in configurations wherein none of the shaft bolt holes are blocked, all washer bolt holes can receive a bolt. In configurations where one or more of the shaft bolt holes are blocked, fewer bolt holes can receive a bolt. For a more standardized assembly process, it may be preferred to always use a number of bolts that equals the number of shaft bolt holes minus the number of slots. When that means that more than one fully accessible shaft bolt holes are not used, the not used shaft bolt holes are preferably symmetrically distributed around the circumference of the washer.

Alternatively, the number of washer bolt holes may be equal to the number of shaft bolt holes minus the number of elongated slots. Since using only this number of bolts is sufficient for ensuring a secure connection of the connection assembly, the missing holes won't be missed. By symmetrically distributing the missing holes around the circumference of the washer, it is ensured that the bolts used are symmetrically distributed too. This special washer makes thus makes it very easy to decide which shaft bolt holes to use for an optimally secure connection.

In a preferred embodiment, the number of shaft bolt holes equals a multiple of the number of elongated slots. This allows for the possibility of having the same number of bolts passing through each elongated slot, and hence can ensure symmetrical balance of the connection assembly.

The number of fasteners/bolts may be equal to the number of shaft bolt holes. This is only possible in the situation where the shaft bolt holes of the hub abutment surface align perfectly with the elongated slots of the first flange when the drive shaft is arranged to abut the hub during assembly. Alternatively, the number of bolts may be equal to the number of shaft bolt holes minus the number of elongated slots. This is the more likely scenario in which the shaft bolt holes of the hub abutment surface misalign with the first flange when the drive shaft is arranged to abut the hub during assembly. Whether the number of bolts equals the number of shaft bolt holes or the number of shaft bolt holes minus the number of elongated slots, the connection assembly provides a secure connection.

In a preferred embodiment, the shaft bolt holes are distributed around one or more concentric circles of the hub abutment surface. This allows for a simplified setting up of the connection assembly. The shaft bolt holes may be distributed substantially evenly around the one or more concentric circles of the hub abutment surface. This ensures a symmetrically balanced connection assembly.

The first flange may extend from a shaft end of the body, and the hub may comprise a second flange extending from a rotational element end of the body for fixedly attaching the hub to the rotational element. A second flange is preferable since it simplifies the process of fixedly attaching the hub to the rotational element. A circumference of the second flange may be larger than a circumference of the first flange. This is because it is advantageous for a secure connection to fix the hub as close as possible to an outer circumference rotational element and an outer circumference of the hub abutment surface and because the rotational element is usually much larger than the hub abutment surface. The body may have a portion that is substantially frustoconical in shape. This ensures that the loads are balanced symmetrically throughout the connection assembly. In the context of a frustoconical-shaped body portion, a wall angle of that frustoconical-shaped body portion that is about 45 degrees provides better access through the hub which is a benefit in terms of access to serviceable components such as sensors. It should be noted that other angles would be acceptable, for example about 40 degrees. Furthermore, a larger angle, for example 60 degrees or above, may provide further advantages in terms of access to components past the body. For the purposes of this discussion, the expressed angle is considered to be taken from the line of the body wall section to the rotational axis of the rotor, which is usually horizontal.

The body may further comprise an auxiliary component portion which provides a connection region to an auxiliary component. The auxiliary component portion may be adjacent to the frustoconical-shaped body portion. Together, the auxiliary component portion and the frustoconical-shaped body portion may be located between the first flange and the second flange.

The invention extends to a generator-gearbox assembly of a wind turbine comprising: a generator having a generator rotor; a gearbox comprising an output shaft; and the connection assembly referred to above; wherein the hub abutment surface of the connection assembly is provided at an end of the output shaft and the body of the hub of the connection assembly is fixedly attached to the generator rotor of the generator.

The invention further extends to a wind turbine comprising the generator-gearbox assembly referred to above.

According to a further aspect of the invention, there is provided a method of connecting an output shaft of a gearbox of a wind turbine to a generator of the wind turbine; the method comprising the steps of: providing a hub abutment surface at an end of the output shaft, the hub abutment surface comprising a plurality of shaft bolt holes; providing a hub associated with the generator rotor and comprising a body and a first flange extending from the body, the first flange having a shaft abutment surface for abutment of the hub abutment surface and one or more elongated slots extending through the first flange, the number of elongated slots being less than or equal to the number of shaft bolt holes; arranging the hub abutment surface to abut the shaft abutment surface; providing a washer comprising a plurality of washer bolt holes; arranging the washer adjacent to the first flange; rotating the washer until at least a portion of the washer bolt holes align with the elongated slots and with the shaft bolt holes; providing a plurality of fasteners; inserting the fasteners successively through the washer bolt holes, the elongated slots and the shaft bolt holes; and securely fastening the fasteners.

In this method, the step of inserting the plurality of fasteners may include identifying the shaft bolt holes which are fully visible through the one or more elongated slots for the insertion of respective fasteners, wherein the identification step is achieved without rotating the generator rotor with respect to the hub abutment surface. Therefore, all of the necessary bolted connections in the hub abutment surface may be identified through the elongated slots which means that the bolt holes become fully visible without having to physically rotate the heavy components of the rotor or the gearbox shaft.

BRIEF DESCRIPTION OF DRAWINGS

The above and other aspects of the invention will now be described, by way of example only, with reference to the accompanying drawings, in which.

DETAILED DESCRIPTION OF PREFERRED EMBODIMENTS

Wind turbines convert kinetic energy from the wind into electrical energy, using a large rotor with a number of rotor blades. A typical Horizontal Axis Wind Turbine (HAVVT) comprises a tower, a nacelle on top of the tower, a rotating hub or 'rotor' mounted to the nacelle and a plurality of wind turbine rotor blades coupled to the hub. Depending on the direction of the wind, the nacelle and rotor blades are turned and directed into an optimal direction by a yaw system for rotating the nacelle and a pitch system for rotating the blades.

The nacelle houses many functional components of the wind turbine, including for example a generator, gearbox, drive train and rotor brake assembly, as well as convertor equipment for converting the mechanical energy at the rotor into electrical energy for provision to the grid. The gearbox steps up the rotational speed of the low speed main shaft and drives a gearbox output shaft. The gearbox output shaft in turn drives the generator, which converts the rotation of the gearbox output shaft into electricity. The electricity generated by the generator may then be converted as required before being supplied to an appropriate consumer, for example an electrical grid distribution system. So-called "direct drive" wind turbines that do not use gearboxes are also known. In a direct drive wind turbine, the generator is directly driven by a shaft connected to the rotor.

A specific embodiment of the present invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
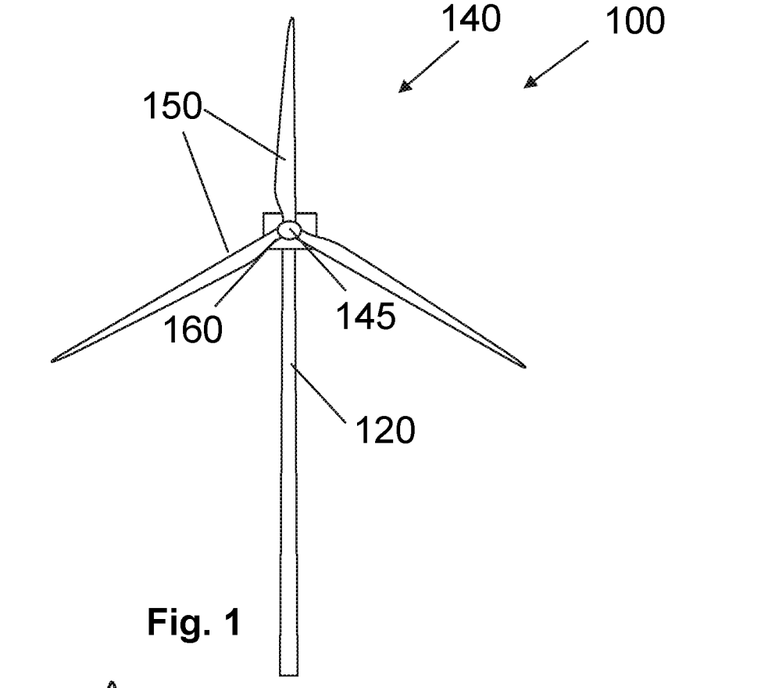
FIG. 1 is a schematic view of a wind turbine comprising a nacelle and a rotor.

In order to place the embodiments of the invention in a suitable context, reference will firstly be made to FIG. 1, which illustrates a typical Horizontal Axis Wind Turbine (HAVVT) 100 in which embodiment of the invention may be implemented. It should be noted in this context that the wind turbine 100 may be on-shore or off-shore. Furthermore, although the wind turbine is question is referred to as having a 'horizontal axis', it will be appreciated by the skilled person that for practical purposes, the axis is usually slightly inclined to prevent contact between the rotor blades and the wind turbine tower in the event of strong winds.

FIG. 1 shows a wind turbine 100 comprising a tower 120, a rotor 140 and a nacelle 160. The nacelle 160 is rotatably mounted on the tower 120 by a yaw system (not shown) for allowing the rotor 140 to be yawed into the direction of the wind. The rotor 140 is rotatably mounted on the nacelle 160. The rotor 140 comprises a rotor hub 145 and three rotor blades 150 coupled to the rotor hub 145.

Figure 2:
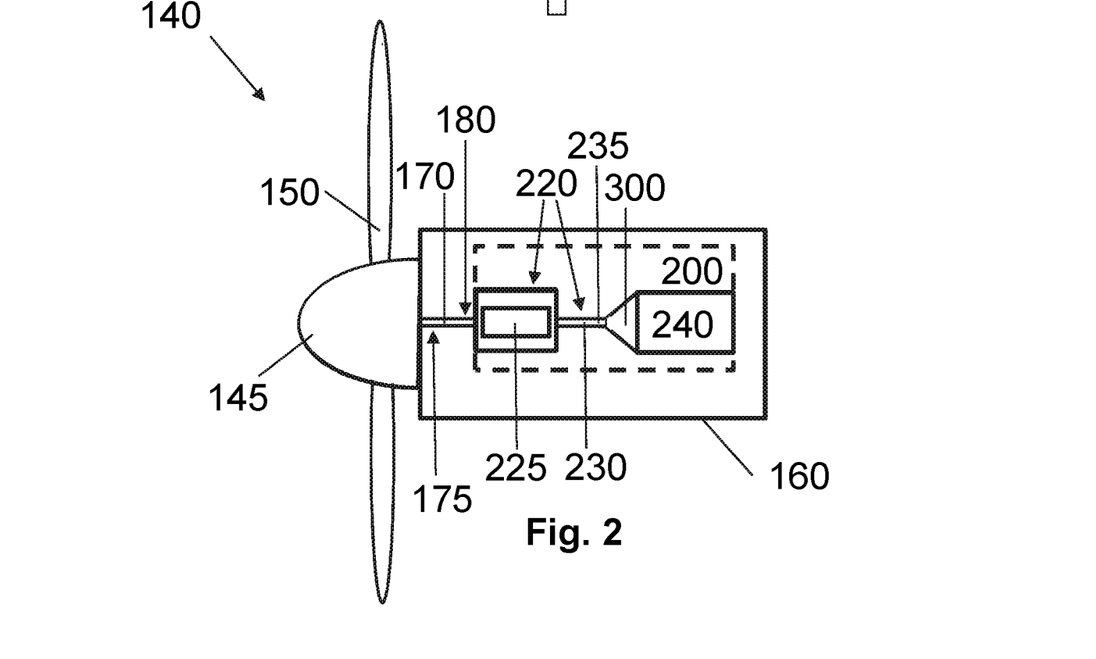
FIG. 2 is a schematic view of the nacelle and the rotor of FIG. 1, the nacelle comprising a generator-gearbox assembly.
Figure 3:
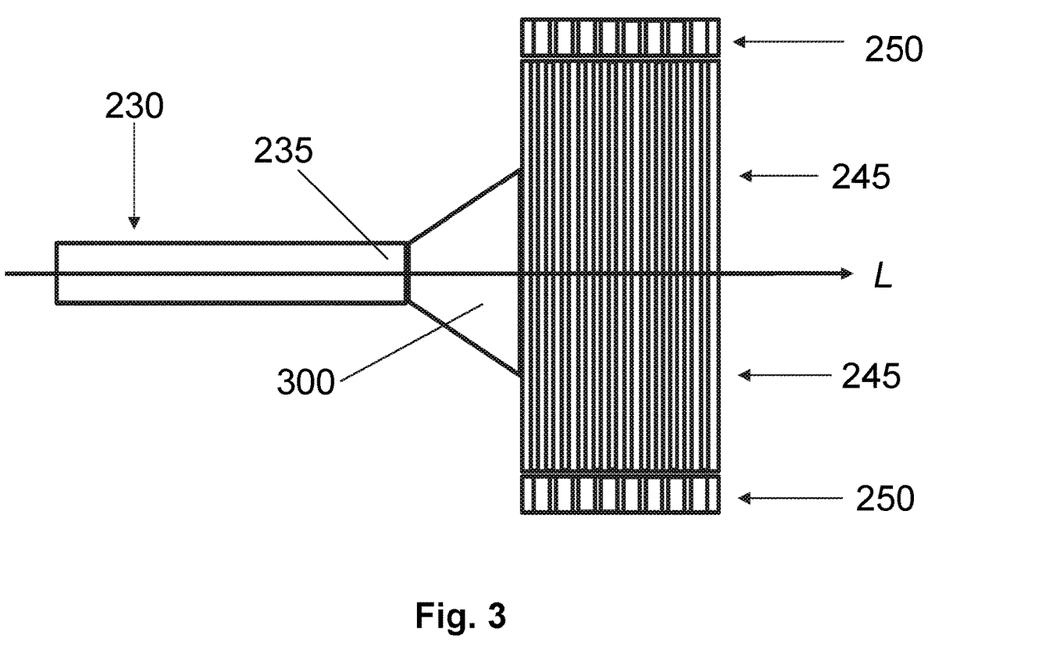
FIG. 3 is a cross-section of at least part of the generator-gearbox assembly of FIG. 2.

The nacelle 160 houses many functional components of the wind turbine 100, including a drive train, power generation equipment and a rotor brake assembly, as well as convertor equipment for converting the mechanical energy of the wind into electrical energy for provision to an electrical grid distribution system. As shown in FIGS. 2 and 3, the nacelle 160 houses a rotor shaft 170 that is fixedly connected to the rotor hub 145 at a rotor end 175 of the rotor shaft 170. The nacelle 160 further comprises a generator-gearbox assembly 200 which is fixedly connected to the low speed rotor shaft 170 at a gearbox end 180 (opposite the rotor end 175) of the rotor shaft 170.

The generator-gearbox assembly 200 comprises a gearbox 220 and a generator 240. The gearbox 220 is fixedly connected to the gearbox end 180 of the rotor shaft 170 and comprises an output shaft 230 which extends along a longitudinal axis L. The gearbox 220 also comprises gear stage(s) 225 which steps up the relatively slow rotation of the rotor shaft so that the output shaft 230 rotates at a higher speed that is more appropriate for the generator 240. The high-speed output shaft 230 is fixedly connected to the generator 240 at a leading end 235 of the output shaft 230 (opposite the gears 225 of the gearbox 220).

The generator 240 is configured to produce electricity using the rotational energy of the output shaft 230. To this end, the generator 240 comprises a generator rotor 245 to which the output shaft 230 is fixedly connected and which rotates as the output shaft 230 rotates, and a generator stator 250 comprising associated windings (not shown).

So as to fixedly connect the output shaft 230 of the gearbox 220 to the generator 240 in accordance with the invention, the generator-gearbox assembly 200 comprises a connection assembly 300. The connection assembly 300 comprises a hub abutment surface 310, a hub 320, and a plurality of bolts (not shown), each of which will now be described in detail. In one embodiment, the connection assembly 300 comprises an intermediate member or 'coupling element' in the form of a washer which ensures a more secure connection for the connection assembly 300.

Figure 4:
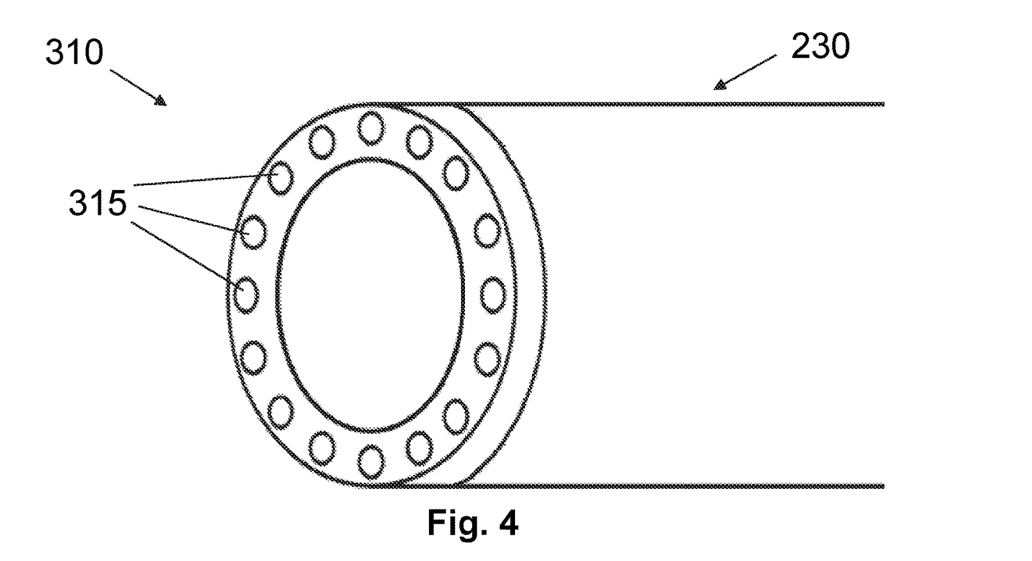
FIG. 4 is a schematic view of part of an output shaft of the generator-gearbox assembly of FIG. 2.

As shown in FIG. 4, the hub abutment surface 310 is provided at the leading end 235 of the output shaft 230. The hub abutment surface 310 may be integral with the output shaft 230, fixedly attached to the output shaft 230 or removably attached to the output shaft 230 as required. Expressed another way, the hub abutment surface 310 may be provided on a different component from the output shaft 230. For optimal torque transfer between the output shaft 230 and the generator rotor 245, a rotationally tight connection between the hub abutment surface 310 and the output shaft 230 is needed.

The hub abutment surface 310 comprises a plurality of shaft bolt holes 315. The shaft bolt holes 315 are distributed around a circle of the hub abutment surface 310 and are preferably located near the outer circumference of the hub abutment surface 310 so as to allow for the greatest number of bolts (not shown) and the securest possible connection assembly 300. The shaft bolt holes 315 are distributed substantially evenly around the circle of the hub abutment surface 310. A circular and symmetric arrangement is optimal for bearing high loads.

It should be noted at this point that the hub 320 may abut the hub abutment surface 310 of the output shaft 230 directly, or indirectly, in that one or more intermediate elements may be included such as the aforementioned washer. Another example is that one or more friction shims could be included. Also, such intermediate elements may be common to the bolts that fix the shaft 230 to the hub, but each bolt may include its own respective intermediate element (e.g. small washers provided on each bolt).

Figure 5:
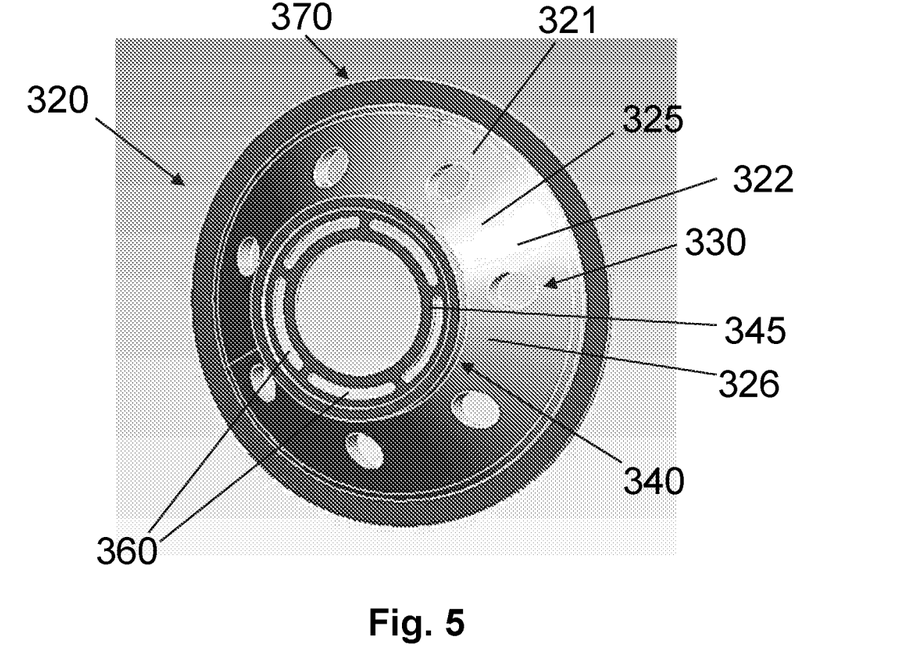
FIG. 5 is a perspective view of a hub of the generator-gearbox assembly of FIG. 2 in accordance with an embodiment of the invention.
Figure 6:
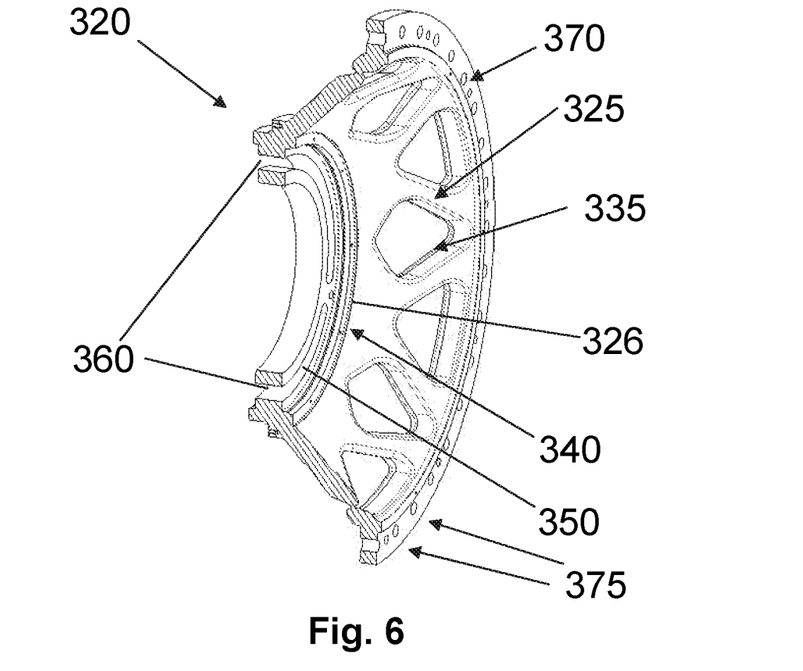
FIG. 6 is a perspective view of a hub of the generator-gearbox assembly of FIG. 2 in accordance with an embodiment of the invention.
Figure 7:
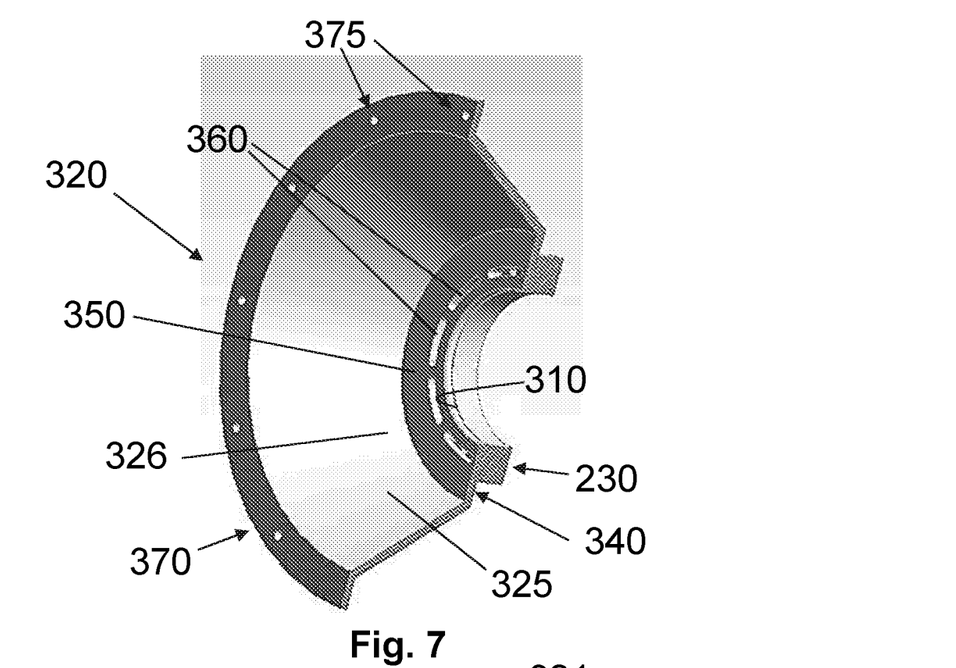
FIG. 7 is a perspective view of a hub and an output shaft of the generator-gearbox assembly of FIG. 2 in accordance with an embodiment of the invention.
Figure 8:
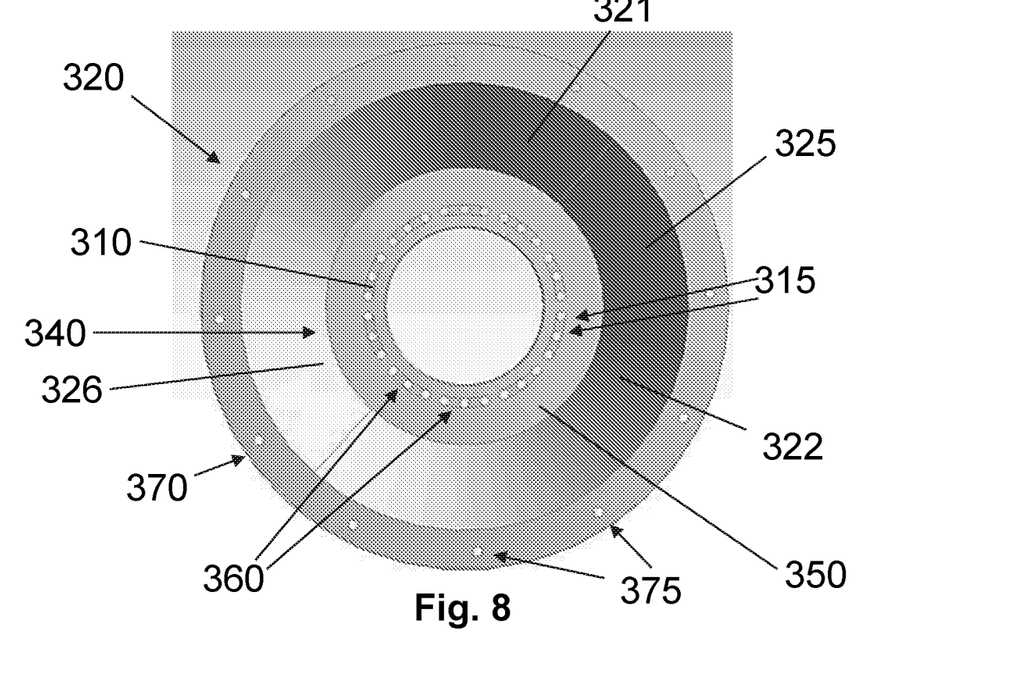
FIG. 8 is a front view of a hub and an output shaft of the generator-gearbox assembly of FIG. 2 in accordance with an embodiment of the invention.

The hub 320 will now be described with reference to FIGS. 5, 6, 7 and 8. FIGS. 5 and 8 each show a hub 320 in perspective, while FIGS. 6 and 7 each show a cross-section of a hub 320. It will be appreciated that the view of the hub 310 in FIGS. 6, 7 and 8 is from the opposite viewing direction to that of FIG. 5.

The hub 320 comprises a body 325 that extends along the longitudinal axis L. The hub 320 is arranged for fixed attachment to the hub abutment surface 310 of the output shaft 230. To this end, the hub 320 comprises a substantially circular first connecting portion or 'flange' 340 that extends from a shaft end 326 of the body 325. The first flange 340 extends substantially in the plane perpendicular to the longitudinal axis L. In FIGS. 4 to 8, the first flange 340 adjoins the body 325 at an outer edge of the first flange 340. The first flange 340 may also adjoin the body 325 at an inner edge of the first flange 340, though this may complicate the process of fixedly attaching the first flange 340 to the hub abutment surface 310 during an assembly of the connection assembly 300, because the acute angle with the hub body 325 may make it more difficult to reach and fasten the bolts.

It should be noted at this point that although the flange 340 is a relative thin component in the axial direction, as is illustrated in the drawings, this should not be considered limiting. Instead the function of the flange 340 should be considered as of prime importance. The flange 340 functions to enable the hub to connect to the output shaft 230 so this functionality could be provided by a flange or 'connecting portion' of much thicker dimensions. Therefore, the term 'flange' used herein should not be interpreted exclusively as requiring a relatively thin radially extending surface or collar and should cover other configurations of connecting portion that enable the hub body 325 to be connected to a shaft abutment surface 310 by a series of bolts, as will be described.

The first flange 340 comprises a shaft abutment surface 345 for abutment of the hub abutment surface 310 of the output shaft 230. In one embodiment, the first flange 340 comprises a washer abutment surface 350 (opposite the shaft abutment surface 345) for abutment of a washer 380. The first flange 340 further comprises a plurality of elongated slots 360 extending or penetrating through the first flange 340. As can be seen in FIGS. 5 to 8, the elongated slots 360 are arced around a circle at the first flange 340. Importantly, the arrangement of the elongated slots 360 of the first flange 340 corresponds to the arrangement of the shaft bolt holes 315 of the hub abutment surface 310. That is to say, they can be considered to share the same 'pitch circle diameter'.

An arc length between any two elongated slots 360 of the first flange 340 is preferably not larger than an arc length between any two shaft bolt holes 315 of the hub abutment surface 310, because otherwise the material of the first flange 340 may simultaneously cover more than one of the shaft bolt holes 315. For optimal structural strength of the flange 340, it may be beneficial to use elongated slots 360 with rounded edges 365. While the number of elongated slots 360 in the first flange 340 may vary from hub 320 to hub 320, to ensure a balanced connection assembly 300 all slots 360 in a particular hub 320 preferably have the same length. Alternatively, slots 360 of two or more different lengths may be arranged symmetrically around the circumference of the flange 340.

In FIGS. 7 and 8, the hub abutment surface 310 of the output shaft 230 is shown abutting the shaft abutment surface 345 of the first flange 340. The first flange 340 and the hub abutment surface 310 are arranged concentrically. In this embodiment, the number of elongated slots 360 in the first flange 340 is less than the number of shaft bolt holes 315 in the shaft and the slot length is large enough to always allow full access to at least two of the shaft bolt holes 315, irrespective of the relative orientation of the first flange 340 with respect to the hub abutment surface 310. Moreover, the number of shaft bolt holes 315 is a multiple of the number of elongate slots 360, ensuring that the same number of bolts can be inserted through each elongated slot 360 for a balanced connection.

In the 'perfectly aligned' optimal relative orientation shown in FIG. 8, exactly three shaft bolt holes 315 are fully accessible in each one of the elongated slots 360. In this configuration the number of bolts (not shown) that can be inserted into each elongated slot 360 equals the number of shaft bolt holes 315 divided by the number of elongated slots 360.

If the hub 320 of FIG. 8 is rotated over a small angle, the elongated slots 360 and shaft bolt holes 315 will be "misaligned": that is, some of the shaft bolt holes 315 are partly, or fully blocked by the first flange 340 such that a bolt (not shown) is not feedable through an elongated slot 360 and each of these shaft bolt holes 315. When misaligned in this way, the number of bolts (not shown) that can be installed equals the number of shaft bolt holes 315 minus the number of elongated slots 360. Expressed another way, the number of bolts that can be inserted into each elongated slot 360 is equal to the total amount of available bolts divided by the number of elongated slots 360.

In decreasing the number of elongated slots 360 of the first flange 340, and thus also the total amount of flange material between elongated slots 360, fewer shaft bolt holes 315 are blocked by the first flange 340 when the first flange is arranged to abut the hub abutment surface 310. However, a first flange 340 with fewer, but longer, elongated slots 360 may also be more fragile.

The hub 320 is also arranged for fixed attachment to the generator rotor 245 of the generator 240. To this end, the hub 320 comprises a substantially circular second connecting portion or 'flange' 370 (best seen in FIGS. 7 and 8) that extends from a generator end 327 (opposite the shaft end 326) of the body 325. Like the first flange 340, the second flange 370 extends substantially in the plane perpendicular to the longitudinal axis L. That is, the first 340 and second 345 flanges extend in parallel. In FIGS. 4 to 8, the second flange 370 adjoins the body 325 at an inner edge of the second flange 370.

The second flange 370 may also adjoin the body 325 at an outer edge of the second flange 370, though this may complicate the process of fixedly attaching the second flange 370 to generator 240 during assembly of the connection assembly 300, because the acute angle with the hub body 325 may make it more difficult to reach and fasten the bolts.

It is envisaged that a practical configuration will be for the hub 320 to be a component that is separate to the generator rotor 245, which is why the illustrated embodiment is shown as including a second flange 370. However, it should be noted that this need not be the case and that the hub 320 may be an integral component to the supporting structure of the generator rotor 245. In either case, the hub 320 can be considered to be 'associated' with the generator rotor 245.

The second flange 370 is fixedly attached to the generator 240 by means of generator bolts (not shown). To this end, the second flange 370 comprises flange bolt holes 375, as shown in FIG. 7, and the generator rotor 245 comprises stator bolt holes (not shown)

The stator bolt holes are located near the outer circumference of the generator rotor 245 to make use of the greatest number of generator bolts (not shown) and to ensure the strongest possible connection.

The hub 320 is arranged such that a circumference of the second flange 370 is larger than a circumference of the first flange 340 as the shaft and the hub abutment surface 310 are smaller than the generator 240 and the generator rotor 245. The first 340 and second 345 flanges are arranged substantially concentrically for balance and for translating rotational forces more efficiently. The body 325 of the hub 320 extends between the first flange 340 and the second flange 370, and, as such, the body of the hub 320 is a substantially frustoconical body 325. The body 325 may be solid, as in FIGS. 8 and 7, or it may be provided with suitable apertures that allow access through the body, such as circular openings 330, as in FIG. 5 or a grid-like structure 335, as in FIG. 6.

It should be noted that that in the illustrated embodiment, the wall section of the frustoconical body defines an angle of about 45 degrees with the major axis of the generator (i.e. the rotational axis L), which is usually horizontal. This is beneficial since it helps maintenance works gain access through the body 325, for example to access component or sensors that may need adjustment or removal. An angle of 45 degrees is just an example, and so it should be appreciated that other angles are acceptable, either less than or greater than 45 degrees. For example, an angle of 40 degrees may still provide useful access, and an angle of 60 degrees may provide improved access.

Alternatively, the hub 320 does not comprise a second flange 370 and the hub 320 is fixedly attached to the generator 240 directly through the body 325 of the hub 325. In another embodiment, the hub 320 may be integral with the generator 240.

Figure 9:
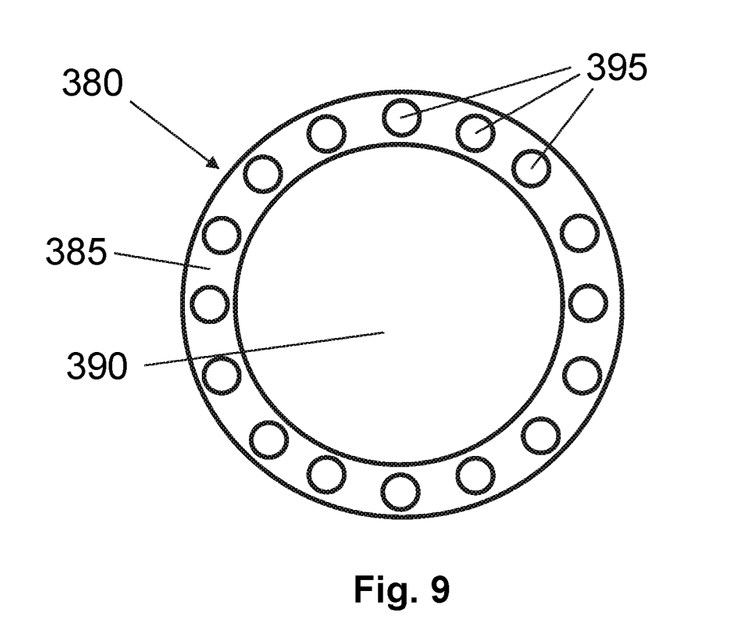
FIG. 9 is a schematic view of a washer that may be used as part of a connection assembly according to the invention.

The washer 380 will now be described with reference to FIG. 9. Note that the washer may also be referred to as an intermediate element, element, or washer element. However, the term 'washer' will be used here for simplicity.

Since each elongated slot 360 of the first flange 340 is larger than each shaft bolt hole 315 of the shaft, it can be beneficial to use a washer 380 so as to provide a more secure connection for the connection assembly 300. The washer 380 may be a substantially circular disc 385 and may have a substantially circular opening 390: that is, the washer 380 may be substantially annular in order to reduce weight and the amount of material used.

In this embodiment, the washer 380 comprises washer bolt holes 395 distributed around a circle of the washer 380. The washer bolt holes 395 preferably have the same size as the shaft bolt holes 315 and match the diameter of the bolts that are used. Importantly, the arrangement of many of the washer bolt holes 395 correspond to the arrangement of respective shaft bolt holes 315 of the hub abutment surface 310 and to elongated slots 360 of the first flange 340. As such, a bolt can be put through a washer hole, an elongated slot and a shaft bolt hole, thereby providing the clamping and friction required for a tight fit in the connection assembly 300.

The number of washer bolt holes 395 in the washer 380 is preferably equal to the number of shaft bolt holes 315 or to the number of shaft bolt holes 315 minus the number of elongated slots 360. When the number of washer bolt holes 395 is equal to the number of shaft bolt holes 315, the arrangement of the washer bolt holes 395 of the washer 380 corresponds to the arrangement of a shaft bolt holes 315 of the hub abutment surface 310.

When the number of washer bolt holes 395 is equal to the number of shaft bolt holes 315 minus the number of elongated slots 360, the arrangement of the washer bolt holes 395 of the washer 380 corresponds to the arrangement of the shaft bolt holes 315 of the hub abutment surface 310, except that every $n^{th}$ washer bolt hole 395 is missing, where n is the number of shaft bolt holes 315 divided by the number of elongated slots 360. As such, connection forces are always evenly distributed around the washer 380.

Because the washer 380 is a loose part, it can be rotated freely until the washer bolt holes 395 are aligned with the shaft bolt holes 315 that are visible through the elongated slots 360. The washer 380 allows for an easy connection of the output shaft 230 and the generator 240, since only the washer 380 needs rotating to form an attachment and not the output shaft 230 or the generator rotor 245 and since the washer 380 is much easier to manoeuvre than the output shaft 230 or the generator rotor 245.

Figure 10:
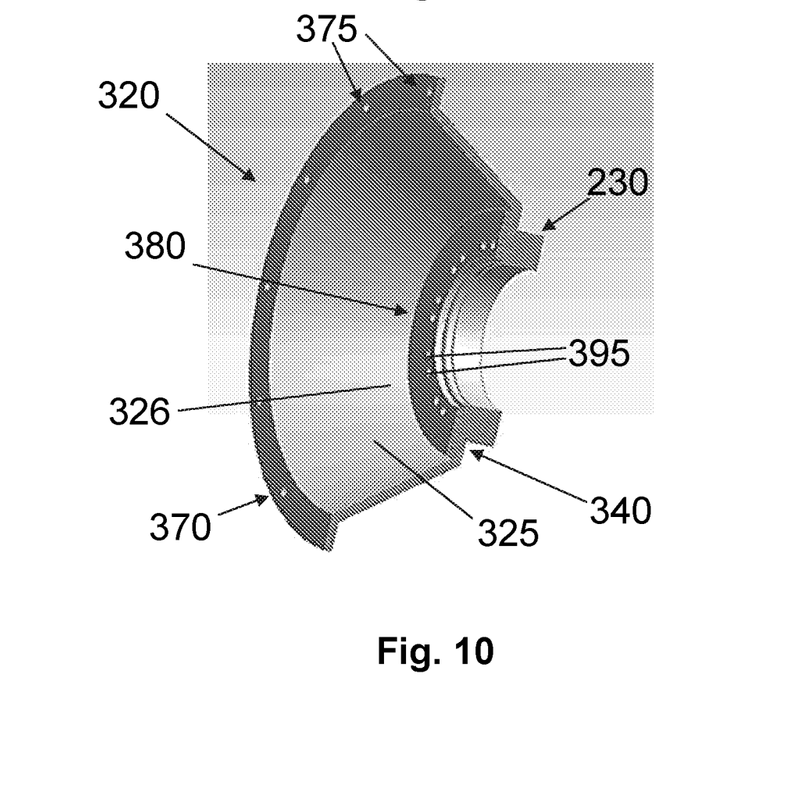
FIG. 10 is a perspective view of a connection assembly for the generator-gearbox assembly of FIG. 2 in accordance with one embodiment of the invention.

FIG. 10 shows a washer 380 abutting the washer abutment surface 350 of the first flange 340 and the shaft abutment surface 345 of the first flange 340 abutting hub abutment surface 310 of the output shaft 230. The first flange 340, the hub abutment surface 310, and the washer 380 are all arranged substantially concentrically. This washer 380 is lacking every third washer bolt hole 395. Though not visible because it is sandwiched between the hub 320 and the hub abutment surface 310 of the gearbox output shaft 230, the first flange 340 has a number of elongated slots 360 that equals the number of "missing" washer bolt holes 395 in the washer 380, and the hub abutment surface 310 has a number of shaft bolt holes 315 that equals the number of washer bolt holes 395 plus the number of elongated slots 360.

Since the arc length between any two adjacent elongated slots 360 of the first flange 340 is less than the arc length between any two adjacent shaft bolt holes 315 of the hub abutment surface 310, a number of shaft bolt holes 315 equalling the number of elongated slots 360 may be blocked by the first flange 340 whenever the output shaft 230 and the first flange 340 are arranged to abut.

By arranging the washer 380 so that the washer bolt holes 395 align with the unblocked shaft bolt holes 315, and inserting bolts successively through the washer bolt holes 395 of the washer 380, through the first flange 340 and through the unblocked shaft bolt holes 315 in the hub abutment surface 310, a fixed connection between the hub 320 and the hub abutment surface 310 is achieved. In this configuration, the point in the circle of the washer 380 where no washer bolt hole 395 is present aligns with the point between the elongated slots 360 in the first flange 340.

Despite not using all of the shaft bolt holes 315 for connection, such an arrangement is very secure. This secure connection is achieved without requiring a perfect alignment of the hub 320 and the output shaft 230. Such a perfect alignment is almost always very unlikely since manoeuvring the output shaft 230 or the generator rotor 245 is very difficult.

While it may be possible that the elongated slots 360 and the shaft bolt holes align perfectly, a number of bolts equalling the number of shaft bolt holes does not need to be used to ensure a secure connection. Indeed, this is why a washer having a number of washer bolt holes equal to the number of shaft bolt holes minus the number of elongated can always be used in accordance with the invention.

Alternatively, a washer 380 may be used having a number and spatial arrangement of washer bolt holes 395 that corresponds to that of the shaft bolt holes 315 of the hub abutment surface 310. However, the washer bolt holes 395 that are blocked by flange material between two elongated slots 360 cannot be used for inserting bolts (not shown).

An exemplary embodiment of the connection assembly 300 includes a hub abutment surface 310 with twenty one shaft bolt holes 315, a first flange 340 with three elongated slots 360 and a washer 380 with either twenty one or eighteen washer bolt holes 395. Even when the elongated slots 360 and the shaft bolt holes 315 misalign, eighteen bolts can be used, ensuring a very secure connection between the output shaft 230 and the generator 240.

Now, a method for assembling the connection assembly 300 above, and for connecting the output shaft 230 to the generator 240, will be described.

The method comprises a step of providing the hub abutment surface 310 at the end of the output shaft 230. This may include integrally forming the hub abutment surface 310 out of the output shaft 230, fixedly attaching a component defining the hub abutment surface 310 to the output shaft 230 or removably attaching the hub abutment surface 310 to the output shaft 230.

The method then comprises the steps of providing the hub 320 and fixedly attaching the hub 320 to the generator 240. This may include fixedly attaching the second flange 370 of the hub 320 to the generator 240 or directly connecting the body 325 of the hub 320 to the generator 240. Alternatively, the hub 320 may be connected to the generator 240 before the hub abutment surface 310 is provided, or the hub 320 is integrally formed out of the generator 240 and does not need to be attached.

Then, the hub abutment surface 310 of the output shaft 230 is arranged to abut the shaft abutment surface 345 of the hub 320. In this position, the hub abutment surface 310 and the first flange 340 are arranged as concentrically as possible. At this point, it most likely that the elongated slots 360 and the shaft bolt holes 315 misalign such that a number of shaft bolt holes 315 equal to the number of elongated slots 360 are blocked by the first flange 340. Next, the method includes a step of providing the washer 380 and a step of arranging it adjacent to the first flange 340. The washer 380 is arranged to abut the washer abutment surface 350 of hub 320 where it can easily be rotated.

The method then includes a step of rotating the washer 380 until at least a portion of the washer bolt holes 395 align with the elongated slots 360 and with the shaft bolt hole, i.e. until at least a number of washer bolt holes 315 equalling the total number of shaft bolt holes 315 minus the number of elongated slots 360 align with the unblocked shaft bolt holes 315. The method then includes a step of providing the bolts (not shown), a step of inserting the bolts successively through the washer bolt holes 395, the elongated slots 360 and the shaft bolt holes 315; and a step of securely fastening the bolts.

If, as will usually be the case, the elongated slots 360 and shaft bolt holes 315 are not perfectly aligned a number of bolts (not shown) is used that equals the total number of shalt bolt holes 315 minus the number of elongated slots 360. If, coincidentally, the elongated slots 360 and shaft bolt holes 315 are perfectly aligned, either the same number of bolts as the number of shalt bolt holes 315 is used or a number of bolts equalling the total number of shaft bolt holes 315 minus the number of elongated slots 360. Both options ensure a secure connection between the output shaft 230 and the hub abutment surface 310.

It will be appreciated by those skilled in the art that the invention has been described by way of example only, and that a variety of alternative approaches may be adopted. For example, in one embodiment, the first flange has only one elongated slot 360 that extends entirely around the first flange 340 in a circle. This embodiment may be less preferable, although technically possible, since a first flange 340 with only one slot 360 is more difficult to handle.

In another embodiment, the shaft bolt holes 315, the elongated slots 360 and the washer 380 are distributed around two or more concentric circles, thus allowing for a more secure connection.

In the above embodiments, the term 'bolt' has been used to refer to the mechanical threaded fasteners that are used to connect the hub to the shaft. However, it should be noted that within the present invention other suitable mechanical fasteners could be used, for example, screws, threaded rods or studs. Moreover, a mix of different fasteners could be used. Threaded fasteners are preferred due to the requirement to apply a compressive force between the hub body 325 and the components to which it attaches. However, non-threaded fasteners such as dowels may be used in combination with threaded fasteners.

In another embodiment, the number of elongated slots 360 in the first flange 340 is equal to the number of shaft bolt holes 315 in the output shaft. Since the elongated slots 360 are elongated, this arrangement allows for a slight misalignment of the output shaft 230 and the hub during assembly. The shaft bolt holes 315 don't have to line up exactly at the centre of the elongated slots 360. However, if the flange material partly or fully blocks the shaft bolt holes 315, the gearbox output shaft 230 (and/or the generator rotor 345) will have to be rotated over a small angle in order to unblock the shaft bolt holes 315. Though this may not be an ideal embodiment in terms of automatically aligning elongated slots 360 and shaft bolt holes 315, it does ensure that all shaft bolt holes 315 can actually be used and an even more secure connection is obtained.

It is noted that, although the invention is described with reference to an output shaft of a wind turbine that is connected to the rotor part of a wind turbine generator, the invention is not limited to this specific application. The connection assembly 300 may also be suitable for fixedly connecting other drive shafts to rotational elements. In any situation where it is difficult to rotationally align a drive shaft with a second rotating element, the advantages of this connection assembly 300 will be apparent.

Figure 11:
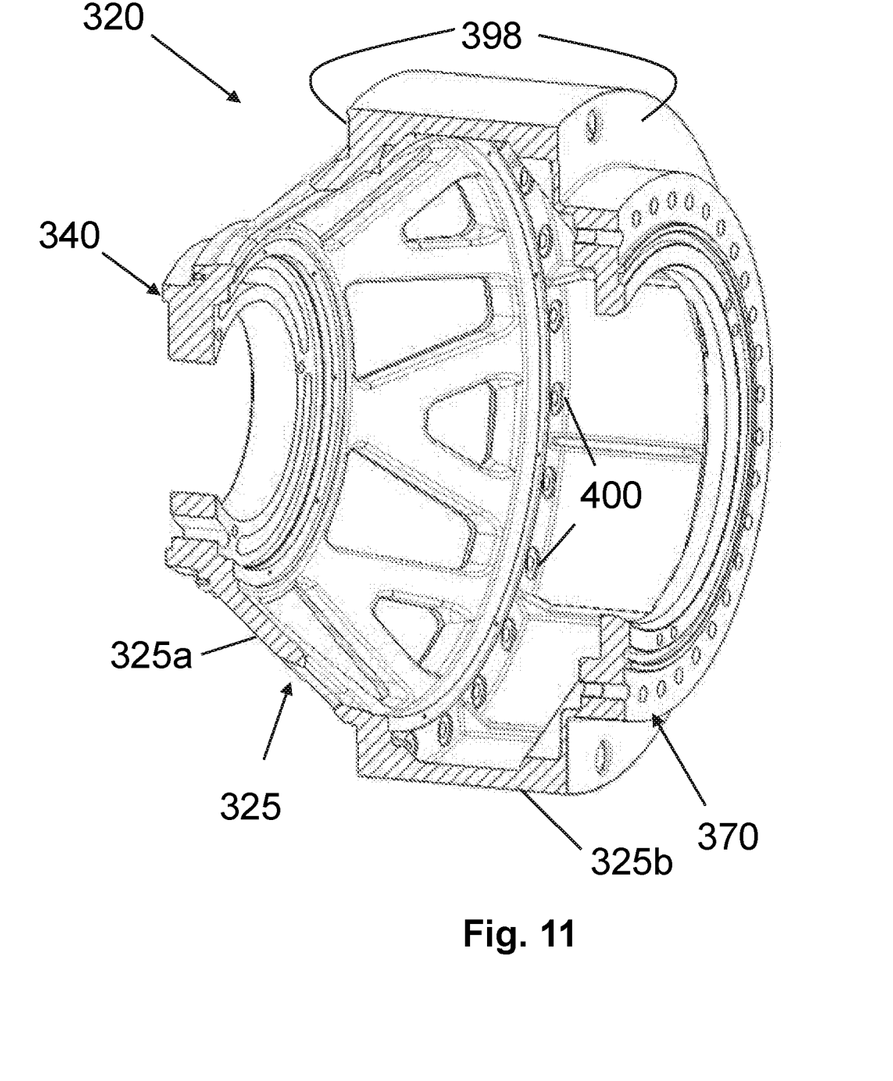
FIG. 11 is a perspective view of an alternative configuration of hub. In the drawings, like features are denoted by like reference signs.

In the illustrated embodiments, the hub 320 includes a frustoconical body 325 that extends between a first connecting flange 340 and a second connecting flange 370. However, other configurations are envisaged. One of these alternative configurations is shown in FIG. 11, in which parts in common with the previous drawings are labelled with the same reference numerals.

In this embodiment, the hub 320 includes a first connecting flange 340, a second connecting flange 370 and a body 325 that extends between the first and second connecting flanges. In the same way, the first flange 340 is penetrated by elongated slots 360 for attachment to a hub abutment surface 310 (not shown in FIG. 11) which is associated with the gearbox output shaft.

The body 325 has a portion 325a which is frustoconical and which flares radially outwards from the first flange 340 when extending towards the second flange 370. However, in this embodiment, it will be noted that the frustoconical portion 325a does not merge into the second flange 370 as was the case with previous embodiments. Instead, the body includes a further portion 325b which has a constant diameter, in this embodiment, and extends in the axial direction between the radially outer edge of the frustoconical section 325a and the second flange 370. Note that the constant diameter portion 325b has a diameter that is larger than the frustoconical portion 325a and so defines a pair of opposed axially facing circular connecting surfaces/flanges 398. The constant diameter portion 325b may provide for an auxiliary function. For example, the radially outer surface of the constant diameter portion 325b may provide a friction surface or clamping surface for a generator brake arrangement. In the illustrated embodiment, one of the flanges 398 is provided with a series of holes 400 (only two of which are shown, for clarity) that may mate with suitable mechanical fasteners to secure a brake disc to the body 325, for example. Other configurations are possible. The constant diameter portion 325b can therefore be considered to be an auxiliary-component portion of the body 325 since it allows for the engagement, coupling or securement of an auxiliary component to the body 325.

These and other variations are possible without departing from the scope of the invention as defined by the appended claims

The invention claimed is:

1. A generator-gearbox assembly for a wind turbine, comprising:
   a generator having a generator rotor;
   a gearbox comprising an output shaft; and
   a connection assembly, the connection assembly comprising:
      a hub abutment surface provided at an end of the output shaft and comprising a plurality of shaft bolt holes;
      a hub associated with the generator rotor and comprising a body and a first connecting portion having a shaft abutment surface facing towards the hub abutment surface and at least one elongated slot extending through the first connecting portion, the number of elongated slots being less than or equal to the number of shaft bolt holes; and
      a plurality of fasteners fixedly connecting the hub to the hub abutment surface, each fastener extending through the at least one elongated slot and a respective one of the plurality of shaft bolt holes,
   wherein the number of elongated slots is less than the number of shaft bolt holes.

2. The generator-gearbox assembly of claim 1, wherein the first connecting portion has a plurality of elongated slots extending therethrough, and wherein each fastener extends through one of the plurality of elongated slots and the respective one of the plurality of shaft bolt holes.

3. The generator-gearbox assembly of claim 1, wherein the connection assembly further comprises a washer, the washer comprising a plurality of washer bolt holes, and wherein each fastener successively extends through a respective one of the plurality of washer bolt holes, the at least one elongated slot, and the respective one of the plurality of shaft bolt holes.

4. The generator-gearbox assembly of claim 1, wherein one or more washers is coupled between the hub abutment surface and the first connecting portion.

5. The generator-gearbox assembly of claim 1, wherein the plurality of shaft bolt holes is distributed around one or more concentric circles of the hub abutment surface.

6. The generator-gearbox assembly of claim 5, wherein the plurality of shaft bolt holes is distributed substantially evenly around the one or more concentric circles of the hub abutment surface.

7. The generator-gearbox assembly of claim 1, wherein the body includes one or more access apertures.

8. The generator-gearbox assembly of claim 7, wherein the one or more access apertures are circular holes.

9. The generator-gearbox assembly of claim 7, wherein the one or more access apertures are grid-like in form.

10. The generator-gearbox assembly of claim 1, wherein the first connecting portion extends from a shaft end of the body, and the hub comprises a second connecting portion extending from a rotational element end of the body for fixedly attaching the hub to the generator rotor.

11. The generator-gearbox assembly of claim 10, wherein a circumference of the second connecting portion is larger than a circumference of the first connecting portion and the body has a portion that is substantially frustoconical in shape.

12. The generator-gearbox assembly of claim 11, wherein the frustoconical portion of the body has a wall angle that defines an angle of at least 40°.

13. The generator-gearbox assembly of claim 11, wherein the body further comprises an auxiliary component portion which provides a connection region to an auxiliary component.

14. A wind turbine comprising the generator-gearbox assembly of claim 1.

15. A method of connecting an output shaft of a gearbox of a wind turbine to a generator of the wind turbine; the method comprising the steps of:
   providing a hub abutment surface at an end of the output shaft, the hub abutment surface comprising a plurality of shaft bolt holes;
   providing a hub associated with a generator rotor of the generator, the hub comprising a body and a first flange extending from the body, the first flange having a shaft abutment surface for abutment of the hub abutment surface and one or more elongated slots extending through the first flange, the number of elongated slots being less than the number of shaft bolt holes;
   arranging the hub abutment surface to abut the shaft abutment surface;
   providing a plurality of fasteners;
   inserting the fasteners successively through the one or more elongated slots and the plurality of shaft bolt holes; and
   securely fastening the fasteners.

16. The method of connecting an output shaft of a gearbox of a wind turbine to a generator of the wind turbine as claimed in claim 15, the method further comprising the steps of, before inserting the fasteners:
   providing a washer comprising a plurality of washer bolt holes,
   arranging the washer adjacent to the first flange,
   rotating the washer until at least a portion of the plurality of washer bolt holes aligns with the one or more elongated slots and with the plurality of shaft bolt holes, and then:
   inserting the fasteners successively through a respective one of the plurality of washer bolt holes, the one or more elongated slots, and a respective one of the plurality of shaft bolt holes.

17. The method of connecting an output shaft of a gearbox of a wind turbine to a generator of the wind turbine as claimed in claim 15, whereby the step of inserting the plurality of fasteners includes the step of identifying the shaft bolt holes which are fully visible through the one or more elongated slots for the insertion of respective fasteners, wherein the identification step is achieved without rotating the generator rotor with respect to the hub abutment surface.

18. The method of connecting an output shaft of a gearbox of a wind turbine to a generator of the wind turbine as claimed in claim 15, further including the step of providing each of the plurality of fasteners with a respective washer prior to inserting said fasteners.

19. A generator-gearbox assembly for a wind turbine, comprising:
a generator having a generator rotor;
a gearbox comprising an output shaft; and
a connection assembly, the connection assembly comprising:
a hub abutment surface provided at an end of the output shaft and comprising a plurality of shaft bolt holes;
a hub associated with the generator rotor and comprising a body and a first connecting portion having a shaft abutment surface facing towards the hub abutment surface and at least one elongated slot extending through the first connecting portion, the number of elongated slots being less than or equal to the number of shaft bolt holes; and
a plurality of fasteners fixedly connecting the hub to the hub abutment surface, each fastener extending through a respective elongated slot and a shaft bolt hole,
wherein at least one of the plurality of shaft bolt holes in the hub attachment surface is at least partially blocked by the hub to prevent a fastener from extending through a respective elongated slot and the at least one of the plurality of shaft bolt holes.

20. A generator-gearbox assembly for a wind turbine, comprising:
a generator having a generator rotor;
a gearbox comprising an output shaft; and
a connection assembly, the connection assembly comprising:
a hub abutment surface provided at an end of the output shaft and comprising a plurality of shaft bolt holes;
a hub associated with the generator rotor and comprising a body and a first connecting portion having a shaft abutment surface facing towards the hub abutment surface and at least one elongated slot extending through the first connecting portion, the number of elongated slots being less than or equal to the number of shaft bolt holes; and
a plurality of fasteners fixedly connecting the hub to the hub abutment surface, each fastener extending through the at least one elongated slot and a respective one of the plurality of shaft bolt holes,
wherein the shaft bolt holes are circular in shape.

21. A generator-gearbox assembly for a wind turbine, comprising:
a generator having a generator rotor;
a gearbox comprising an output shaft; and
a connection assembly, the connection assembly comprising:
a hub abutment surface provided at an end of the output shaft and comprising a plurality of shaft bolt holes;
a hub associated with the generator rotor and comprising a body and a first connecting portion having a shaft abutment surface facing towards the hub abutment surface and at least one elongated slot extending through the first connecting portion, the number of elongated slots being less than or equal to the number of shaft bolt holes; and
a plurality of fasteners fixedly connecting the hub to the hub abutment surface, each fastener extending through the at least one elongated slot and a respective one of the plurality of shaft bolt holes,
wherein each at least one elongated slot extending through the first connecting portion of the hub is open to a plurality of shaft bolt holes in the hub abutment surface.

* * * * *